US009327714B2

(12) United States Patent
Pettersson et al.

(10) Patent No.: US 9,327,714 B2
(45) Date of Patent: May 3, 2016

(54) METHOD FOR SIMULTANEOUS CONTROL OF TORQUE FROM COMBUSTION ENGINE AND ELECTRIC MACHINE IN A HYBRID VEHICLE

(71) Applicant: SCANIA CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/410,611

(22) PCT Filed: Jun. 26, 2013

(86) PCT No.: PCT/SE2013/050775

§ 371 (c)(1),
(2) Date: Dec. 23, 2014

(87) PCT Pub. No.: WO2014/003657

PCT Pub. Date: Jan. 3, 2014

(65) Prior Publication Data

US 2015/0149013 A1 May 28, 2015

(30) Foreign Application Priority Data

Jun. 27, 2012 (SE) ...................................... 1250700

(51) Int. Cl.
*B60W 20/00* (2006.01)
*B60W 10/10* (2012.01)
(Continued)

(52) U.S. Cl.
CPC ................ *B60W 20/10* (2013.01); *B60K 6/365* (2013.01); *B60K 6/387* (2013.01); *B60K 6/48* (2013.01);
(Continued)

(58) Field of Classification Search
CPC ..... B60W 20/10; B60W 10/06; B60W 10/08; B60W 10/115; Y10S 903/93
USPC ............. 701/22; 180/65.265, 65.285, 65.275; 903/930
See application file for complete search history.

(56) References Cited

U.S. PATENT DOCUMENTS 8,306,681 B2 * 11/2012 Soma .............................. 701/22
2003/0166429 A1 * 9/2003 Tumback .......................... 475/5
(Continued)

FOREIGN PATENT DOCUMENTS

| | | |
|---|---|---|
| EP | 1 316 460 A1 | 6/2003 |
| EP | 1 319 546 | 6/2003 |
| EP | 1 790 842 A2 | 5/2007 |
| SE | 1051384-4 | 6/2012 |

OTHER PUBLICATIONS

International Search Report dated Oct. 28, 2013 issued in corresponding International patent application No. PCT/SE2013/050775.

*Primary Examiner* — Nga X Nguyen
(74) *Attorney, Agent, or Firm* — Ostrolenk Faber LLP

(57) ABSTRACT

A method for driving a vehicle having a propulsion system comprising a combustion engine with an output shaft, a gearbox with an input shaft, an electric machine comprising a stator and a rotor, and a planetary gear comprising a sun gear, a ring gear and a planet wheel carrier. The vehicle is driven with the members of the planetary gear interlocked. The planetary gear is brought to the releasing position by controlling the torque of the electric machine and of the combustion engine towards torque balance in the planetary gear.

6 Claims, 3 Drawing Sheets

18
20
21
19
9
9a
17
9b
11
13
15
16
7
10
2
3
2a
3a
14
15a
12b
12
12a
8

(51) Int. Cl.

| | |
|---|---|
| ***B60K 6/365*** | (2007.10) |
| ***B60K 6/48*** | (2007.10) |
| ***B60W 10/08*** | (2006.01) |
| ***B60K 6/387*** | (2007.10) |
| ***B60W 10/02*** | (2006.01) |
| ***B60W 10/06*** | (2006.01) |
| ***B60W 10/115*** | (2012.01) |

(52) U.S. Cl.

CPC ............... *B60W 10/02* (2013.01); *B60W 10/06* (2013.01); *B60W 10/08* (2013.01); *B60W 10/115* (2013.01); *B60Y 2400/421* (2013.01); *Y02T 10/6221* (2013.01); *Y10S 903/93* (2013.01)

(56) References Cited

U.S. PATENT DOCUMENTS

| | | | | |
|---|---|---|---|---|
| 2004/0153234 | A1* | 8/2004 | Mogi et al. .................... | 701/103 |
| 2010/0227734 | A1 | 9/2010 | Wallner et al. | |
| 2012/0004797 | A1 | 1/2012 | Baino et al. | |
| 2012/0053011 | A1* | 3/2012 | Onomura et al. ................. | 477/3 |

* cited by examiner

METHOD FOR SIMULTANEOUS CONTROL OF TORQUE FROM COMBUSTION ENGINE AND ELECTRIC MACHINE IN A HYBRID VEHICLE

CROSS-REFERENCE TO RELATED APPLICATIONS

The present application is a 35 U.S.C. §§371 National Phase conversion of PCT/SE2013/050775, filed Jun. 26, 2013, which claims priority of Swedish Patent Application No. 1250700-0, filed Jun. 27, 2012, the contents of which are incorporated by reference herein. The PCT International Application was published in the English language.

FIELD OF THE INVENTION AND PRIOR ART

The present invention relates to a method of driving a vehicle.

The invention is especially, but not exclusively directed to a method for driving motor vehicles in the form of wheeled utility vehicles, especially such vehicles which are heavy, such as trucks and buses.

Accordingly, the invention relates to a method for driving a hybrid vehicle, which is generally a vehicle which may be driven by a primary engine, here a combustion engine, and a secondary engine, here an electric machine. The electric machine is suitably provided with means for storing energy, such as a battery or a capacitor for storing electrical energy, and regulating equipment for regulating the flow of electrical energy between said means and the electric machine. The electric machine may operate as a motor and a generator depending upon the state of operation of the vehicle. When the vehicle is braked, the electric machine generates electrical energy which may be stored and later be utilized, for example, for driving the vehicle.

The utilization of a conventional clutch mechanism to disconnect the input shaft of the gearbox with respect to the combustion engine during the gearchanging process in the gearbox results in disadvantages, such as heating of the discs of the clutch mechanism, which results in increased fuel consumption and wear of the clutch discs. Considerable losses are caused when starting the vehicle. Furthermore, a conventional clutch mechanism is comparatively heavy and costly. It also requires a comparatively large space in the vehicle. Friction losses are also created when using a hydraulic converter/torque transformer of the type usually used in automatic gearboxes. The conventional clutch mechanism and the disadvantages associated therewith may be avoided by providing the vehicle with a propulsion system in which the output shaft of the combustion engine, the rotor of the electric machine and the input shaft of the gearbox are interconnected by a planetary gear. A vehicle having a propulsion system of this type is known through EP 1 319 546.

There is, of course, an ongoing attempt to improve the way to drive a vehicle having such a propulsion system with respect to energy efficiency and to regenerate as much of the brake energy as possible when braking the vehicle. The reason for driving such a vehicle with a locking means in the locking position is because this is, from the energy point of view, most advantageous for positive torques in the drivetrain formed by the propulsion system.

SUMMARY OF THE INVENTION

The object of the present invention is to provide a method of the type defined in the introduction considering the attempt mentioned above. This object is obtained by providing a method disclosed herein.

It is, in some situations, desired and in others completely necessary to transfer the planetary gear to the free position, i.e. with the locking means in the releasing position. An example of this is when braking towards a stop for being able to brake with the electric machine when the input shaft of the gearbox rotates slower than the first component does for idling rotational speed of the combustion engine. It is, during some gearchanges, desirable to put the planetary gear in the free position for performance reasons. Furthermore, it is, for low torques in the drivetrain, often fuel efficient to drive the vehicle with a free planetary gear. By torque controlling the electric machine and the combustion engine according to the invention towards torque balance in the planetary gear, the planetary gear may be transferred from a locked state to a free state at the same time as torque is transferred therethrough, i.e. without torque interruption. This is advantageous from a driving comfort point of view and also from an energy efficiency point of view.

According to an embodiment of the invention, the method is carried out for a vehicle having a propulsion system with a sun gear as a first component of a planetary gear and a ring gear as a third component thereof, and such a propulsion system is described in the still unpublished SE 1051384-4 and has a number of advantages with respect to a propulsion system according to EP 1 319 546 mentioned above, which uses the ring gear as the first component and the sun gear as the third component. A compact construction is easy to build into spaces already existing for drivetrains (propulsion systems) having clutch mechanisms instead of planetary gears and is obtained by connecting the electric machine with the ring gear and the output shaft of the combustion engine with the sun gear. A hybridized gearbox may then be made size and weight compatible with a standard gearbox and standardized interfaces may be maintained. This means that the weight increase normally associated with a hybridization may be reduced considerably. Another advantage is that a connection of the electric machine with the ring gear means a higher possible brake torque than would be possible if it were connected to the sun gear.

According to another embodiment of the invention the sun gear and the planet wheel carrier are interconnected by said locking means and are released so as to be allowed to rotate with different rotational speeds. It is in this position, easy to obtain a locking means which may be reliably controlled by simple means. Less torque is transferred through the planetary gear wheels in this manner. Only the torque of the electric machine is transferred through these gear wheels.

The invention also relates to a computer program, a computer program product, an electronic control unit and a vehicle.

Other advantageous features and advantages of the invention and described in the description below.

BRIEF DESCRIPTION OF THE DRAWINGS

With reference to the appended drawings, below follows a specific description of an embodiment of the invention cited as an example.

In the drawings.

DETAILED DESCRIPTION OF AN EMBODIMENT OF THE INVENTION

Figure 1:
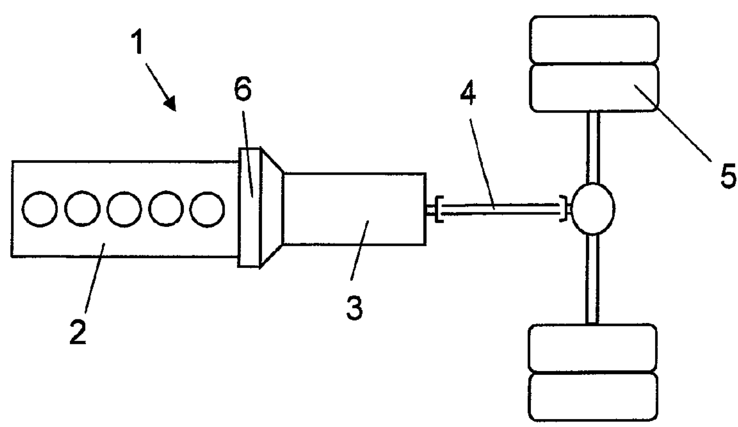
FIG. 1 is a very simplified view of a drivetrain of a vehicle for which a method according to the invention may be carried out.
Figure 2:
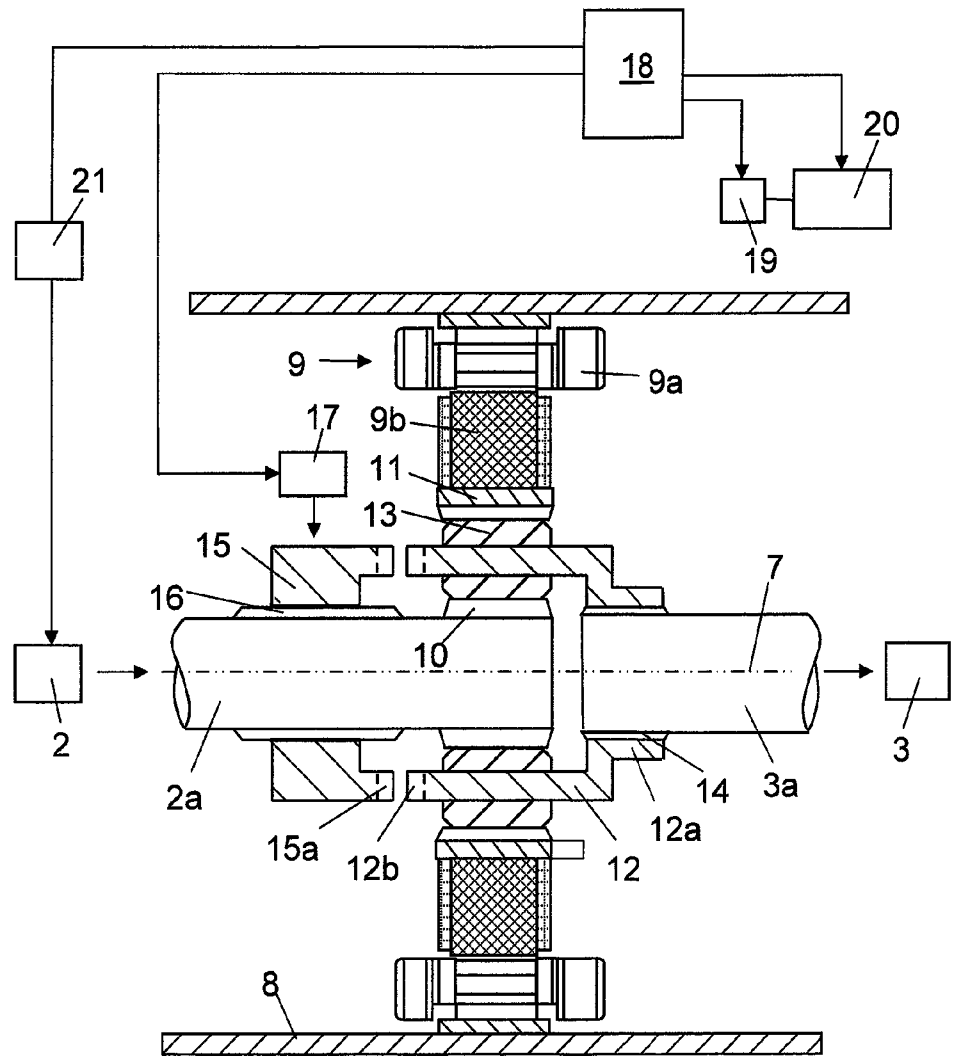
FIG. 2 is a still simplified but more detailed view of a part of a said propulsion system.

FIG. 1 shows a drivetrain for a heavy vehicle 1. The drivetrain comprises a combustion engine 2, a gearbox 3, a number of drive shafts 4 and drive wheels 5. The drivetrain includes between the combustion engine 2 and the gearbox 3, an intermediate portion 6. FIG. 2 shows a more detailed view of the components in the intermediate portion 6. The combustion engine 2 is provided with an output shaft 2*a* and the gearbox 3 includes an input shaft 3*a* in the intermediate portion 6. The output shaft 2*a* of the combustion engine is arranged coaxially with respect to the input shaft 3*a*of the gearbox. The output shaft 2*a* of the combustion engine and the input shaft 3*a* of the gearbox are arranged to rotate around a common rotation axis 7. The intermediate portion 6 comprises a housing 8 enclosing an electric machine 9 and a planetary gear. The electric machine 9 comprises, as usual, a stator 9*a* and a rotor 9*b*. The stator 9*a* comprises a stator core secured in a suitable way on the inner side of the housing 8. The stator core comprises stator windings. The electric machine 9 is adapted to, in certain operation situations, utilize electric energy stored for supplying drive power to the input shaft 3*a* of the gearbox, and in other operation situations, utilize kinetic energy of the input shaft 3*a* of the gearbox for generating and storing electric energy.

The planetary gear is arranged substantially radially internally of the stator 9*a* and the rotor 9*b* of the electric machine. The planetary gear comprises, as usual, a sun gear 10, a ring gear 11 and a planet wheel carrier 12. The planet wheel carrier 12 carries a number of gear wheels 13, rotatably arranged in a radial space between the teeth of the sun gear 10 and the ring gear 11. The sun gear 10 is secured to a circumferential surface of the output shaft 2*a* of the combustion engine. The sun gear 10 and the output shaft 2*a* of the combustion engine rotate as a unit with a first rotational speed $n_1$. The planet wheel carrier 12 comprises a fastening portion 12*a* fastened to a circumferential surface of the input shaft 3*a* of the gearbox by means of a splined connection 14. The planet wheel carrier 12 and the input shaft 3*a* of the gearbox may, by means of this connection, rotate as a unit with a second rotational speed $n_2$. The ring gear 11 comprises an external circumferential surface onto which the rotor 9*b* is secured. The rotor 9*b* and the ring gear 11 form a rotatable unit rotating with a third rotational speed $n_3$.

The propulsion system comprises a locking means in that the output shaft 2*a* of the combustion engine is provided with a displaceable coupling member 15. The coupling member 15 is fastened to the output shaft 2*a* of the combustion engine by means of a splined connection 16. The coupling member 15 is fixed against rotation to the output shaft 2*a* of the combustion engine and displaceable in an axial direction on the output shaft 2*a* of the combustion engine. The coupling member 15 comprises a coupling portion 15*a* connectable to a coupling portion 12*b* of the planet wheel carrier 12. A displacing member 17 is schematically shown and is adapted to displace the coupling member 15 between a first position in which the coupling portions 15*a*, 12*b* are not mutually engaged, corresponding to a releasing position of the locking means, and a second position in which the coupling portions 15*a*, 12*b* are mutually engaged, corresponding to a locking position of the locking means. The output shaft 2*a* of the combustion engine and the input shaft 3*a* of the gearbox will, in this locking position, be interlocked and these and the rotor of the electric machine will rotate with the same rotational speed. This state may be called locked planet. The locking mechanism may also comprise a sleeve provided with first splines which, in the releasing position, engage second splines on a first component of the planetary gear and in the locking position engage third splines on a second component of the planetary gear. The first component of the planetary gear is, in this case, preferably the planet wheel carrier and the second component is the sun gear. The locking mechanism may be designed as a sleeve with a ring shape enclosing the planet wheel carrier substantially concentrically.

An electric control unit 18 is designed to control the displacing member 17. The control unit 18 is also configured to determine on which occasions the electric machine shall operate as a motor and on which occasions it shall operate as a generator. The control unit 18 may receive current information about suitable operation parameters to make this determination. The control unit 18 may be a computer with software for this task. The control unit 18 controls regulating equipment 19 schematically shown, which regulates the flow of electric energy between a hybrid battery 20 and the stator windings 9*a* of the electric machine. On occasions when the electric machine 9 operates as a motor, electric energy is supplied from the hybrid battery 20 to the stator 9*a*. On occasions on which the electric machine operates as a generator, electric energy is supplied from the stator 9*a* to the hybrid battery 20. The hybrid battery 20 delivers and stores electric energy with a voltage on the order of 200-800 volts. Since the intermediate portion 6 between the combustion engine 2 and the gearbox 3 in a vehicle is a restricted space, it is required that the electric machine 9 and the planetary gear constitute a compact unit. The components 10, 11, 12 of the planetary gear are arranged substantially radially internally of the stator 9*a* of the electric machine. The rotor 9*b* of the electric machine, the ring gear 11 of the planetary gear, the output shaft 2*a* of the combustion engine and the input shaft 3*a* of the gearbox are here arranged to rotate around a common rotation axis 7. The electric machine 9 and the planetary gear occupy a comparatively small space. The vehicle 1 is provided with a motor control function 21 through which the rotational speed $n_1$ of the combustion engine 2 may be regulated. The control unit 18 has the ability to activate the motor control function 21 and create a state of zero torque in the gearbox when gears in the gearbox 3 are engaged and disengaged. The propulsion system may, of course, instead of being controlled by one single control unit 18, be controlled by several different control units.

When the method is started, the vehicle is driven with the locking means in the locking position. This means that all three components of the planetary gear rotate with the same rotational speed. A need to transfer the locking means to the releasing position is then detected.

The method is then started by determining that the locking means shall be transferred to the releasing position, whereupon the control unit 18 controls the electric machine 9 to apply a first torque, equal to the product of the propulsion system torque required and the transmission ratio of the planetary gear, through the rotor 9*b* of the electric machine 9, to the ring gear 11. The first torque is further propagated from the ring gear 11 through the planet wheel carrier 12 to the input shaft 3*a* of the gearbox. Furthermore, corresponding to the product the propulsion system torque required and the transmission ratio of the planetary gear, and the control unit 21 controls the combustion engine 2 to apply a second torque, equal to the product of the propulsion system torque required and (1—the transmission ratio of the planetary gear), through the output shaft 2*a* of the combustion engine 2, to the sun gear

10. The second torque is further propagated from the sun gear 10 through the planet wheel carrier 12 to the input shaft 3a of the gearbox corresponding to the product of the propulsion system torque requested and (1—the transmission ratio of the planetary gear). Thus, the total of the first torque and the second torque applied to the input shaft 3*a* of the gearbox is equal to the propulsion system torque required. The transmission ratio of the planetary gear is the number of teeth of the ring gear/(the number of teeth of the sun gear +the number of teeth of the ring gear), when the sun gear is connected to the output shaft of the combustion engine and the ring gear is connected with the rotor of the electric machine. Accordingly, the electric machine and the combustion engine are controlled with respect to torque towards torque balance in the planetary gear. The locking means is transferred to the releasing position by displacing the coupling member 15 when torque balance has been obtained. Thus, the planetary gear could, through the method according to the present invention, be transferred from locked to free position at the same time as torque has been transferred therethrough.

A number of different reasons to do this while driving said vehicle have been mentioned above, and a further reason may be that the free position may be used for skipping gear-changing steps during the acceleration of the vehicle. The method according to the invention may be carried out when it is time to change up, whereupon it is accelerated further by means of the larger rotational speed range of the electric machine, whereupon synchronization of the rotation speeds of the input shaft of the gearbox with the shaft rotational speed of a higher gear in the gearbox takes place before this gear is finally engaged.

Computer program code for implementing a method according to the invention is suitably included in a computer program which is readable into an internal memory of a computer, such as the internal memory of an electronic control unit of a motor vehicle. Such a computer program is suitably provided through a computer program product comprising a data storing medium readable by an electronic control unit, which data storing medium has the computer program stored thereon. Said data storing medium is, for example, an optical data storing medium in the form of a CD-ROM-disc, a DVD-disc, etc., a magnetic data storing medium in the form of a hard disc, a diskette, a tape etc., or a Flash memory or a memory of the type ROM, PROM, EPROM or EEPROM.

Figure 3:
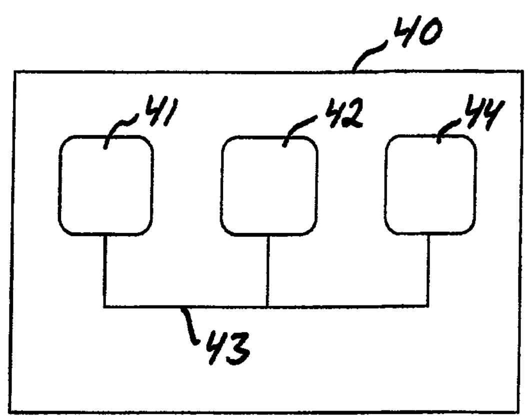
FIG. 3 is a principle sketch of an electronic control unit for implementing a method according to the invention.
Figure 4:
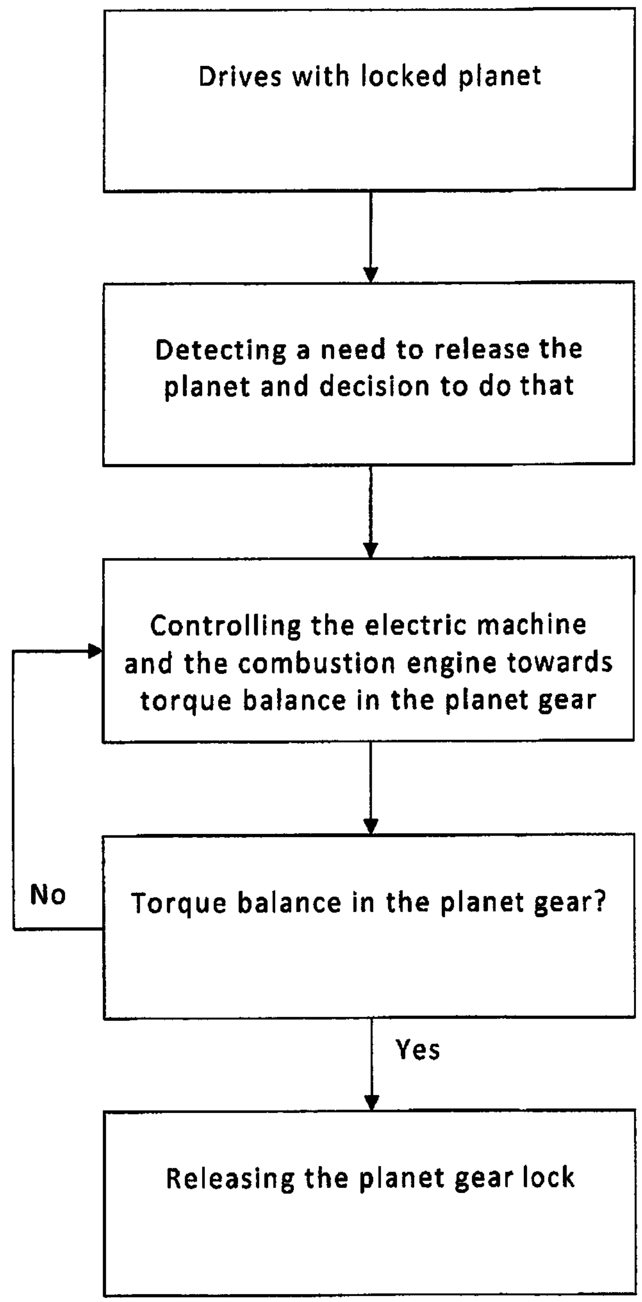
FIG. 4 is a flow chart illustrating a method according to an embodiment of the invention.

FIG. 3 illustrates schematically, an electronic control unit 40 comprising an execution means 41, such as a central processor unit (CPU), for executing a computer program. The execution means 41 communicates with a memory 42, for example of the type RAM, through a data bus 43. The control unit 40 comprises a data storing medium 44, for example in the form of a Flash memory or a memory of the type ROM, PROM, EPROM or EEPROM. The execution means 41 communicates with the data storing medium 44 through a data bus 43. A computer program comprising computer program code for implementing a method according to the invention, for example in accordance with the embodiment illustrated in FIG. 4, is stored on the data storing medium 44.

The invention is of course not in any way restricted to the embodiments described above, but many possibilities for modifications thereof would be apparent to a person with skill in the art without departing from the scope of the invention as defined in the appended claims.

The locking means may be designed to interlock any two of said three components of the planetary gear.

A transmission could be arranged between the rotor and the ring gear and also between the output shaft of the combustion engine and the sun gear, such as upstream of the shaft shown in the figures to be connected to the sun gear. The transmission may also be formed by a variable gear.

It is also conceivable that the method is carried out for a vehicle having the ring gear as the first component and the sun gear as the third component, although the opposite would probably often be preferred through the advantages thereof mentioned above.

The invention claimed is:

1. A method for driving a vehicle having a propulsion system comprising a combustion engine including an output shaft, a gearbox including an input shaft, an electric machine comprising a stator and a rotor, and a planetary gear comprising three components in the form of a sun gear, a ring gear and a planet wheel carrier;

the output shaft of the combustion engine connected to a first one of said components of the planetary gear so that a rotation of this shaft causes rotation of this first component, the first component being secured to a circumferential surface of the output shaft;

the input shaft of the gearbox being connected to a second one of said components of the planetary gear so that a rotation of this shaft causes rotation of this second component;

the rotor of the electric machine being connected to a third one of said components of the planetary gear so that a rotation of the rotor causes rotation of this third component; and said propulsion system further comprising a locking means movable between a locking position in which two of said three components of the planetary gear are interlocked so that said three components thereof rotate with the same rotational speed and a releasing position in which said three components of the planetary gear are allowed to rotate with different rotational speeds;

said method comprising the following steps:

a) determining that the locking means shall be moved to the releasing position from the locking position, b) controlling the electric machine to apply a first torque corresponding to the product of a propulsion system torque requested and a transmission ratio of the planetary gear and, at the same time, controlling the combustion engine to apply a second torque corresponding to the product of the propulsion system requested torque and a value obtained by subtracting the transmission ratio of the planetary gear from 1, and c) moving the locking means to the releasing position when both said first torque and said second torque have been provided such that torque balance exists in the planetary gear.

2. A method according to claim 1, wherein the sun gear is said first component of the planetary gear and the ring gear is said third component of the planetary gear .

3. A method according to claim 1, wherein the sun gear and the planet wheel carrier are interlocked by said locking means and are released in step c) so as to be allowed to rotate with different rotational speeds.

4. A computer program product comprising a non-transitory data storing medium and a computer program comprising computer program code contained on the non-transitory data storing medium and readable by a computer, which when the program code is executed in the computer, causes the computer to implement the method according to claim 1.

5. An electronic control unit of a motor vehicle comprising an execution means, a memory connected to the execution means and a non-transitory data storing medium connected to the execution means, in which the computer program code of the computer program product according to claim 4 is stored on said non-transitory data storing medium.

6. A vehicle comprising an electronic control unit according to claim 5.

* * * * *